US006954023B2

(12) United States Patent
Hata et al.

(10) Patent No.: US 6,954,023 B2
(45) Date of Patent: Oct. 11, 2005

(54) LINEAR ACTUATOR

(75) Inventors: Yoshiaki Hata, Ashiya (JP); Yasuhiro Okamoto, Tondabayashi (JP)

(73) Assignee: Minolta Co., Ltd., Osaka (JP)

( * ) Notice: Subject to any disclaimer, the term of this patent is extended or adjusted under 35 U.S.C. 154(b) by 78 days.

(21) Appl. No.: 10/447,108

(22) Filed: May 29, 2003

(65) Prior Publication Data

US 2003/0222538 A1 Dec. 4, 2003

(30) Foreign Application Priority Data

Jun. 4, 2002 (JP) ....................................... 2002-162949

(51) Int. Cl.[7] ................................................ H01L 41/08

(52) U.S. Cl. ....................... 310/328; 400/283; 400/701; 347/30; 347/34; 347/37

(58) Field of Search ............................ 318/135; 310/15, 310/17, 19, 328; 400/283, 701; 347/30, 34, 37; 101/425, 423

(56) References Cited

U.S. PATENT DOCUMENTS 4,706,605 A * 11/1987 Bibl et al. .................. 118/631
5,179,304 A * 1/1993 Kenjo et al. .................. 310/12
6,215,973 B1 * 4/2001 Shin ........................... 399/249
6,241,337 B1 * 6/2001 Sharma et al. ................ 347/33
6,676,242 B2 * 1/2004 Yun ............................ 347/28

FOREIGN PATENT DOCUMENTS

| | | | | |
|---|---|---|---|---|
| JP | 02-283815 | | 11/1990 | F02B/27/06 |
| JP | 04-88275 | | 3/1992 | F16K/31/04 |
| JP | 11-151598 | | 6/1999 | B30B/11/18 |
| JP | 2001341827 A | * | 12/2001 | B65G/39/09 |
| JP | 2004172961 A | * | 6/2004 | H04N/5/225 |

* cited by examiner

*Primary Examiner*—Darren Schuberg
*Assistant Examiner*—J. Aguirrechea
(74) *Attorney, Agent, or Firm*—McDermott Will & Emery LLP

(57) ABSTRACT

In order to provide a linear actuator which is capable of solving deposition of deposit due to a long-time use and preventing malfunction, the linear actuator has a driving shaft 3 which reciprocates or expands and contracts to its axial direction, a slider 4 which is frictionally engaged with the driving shaft so as to be movable along the driving shaft, and driving controller for controlling a motion of the driving shaft so that the slider moves to an arbitrary moving direction. The driving controller has a self-maintenance mode for advancing N2 and retreating N1 the slider 4 alternatively, and making an advancing amount and a retreating amount different, controlling the driving shaft 3 so as to entirely move the slider 4 to any one of the directions.

19 Claims, 5 Drawing Sheets

LINEAR ACTUATOR

This application is based on application No. JP 2002-162949 filed in Japan, the contents of which is hereby incorporated by reference.

BACKGROUND OF THE INVENTION

1. Field of the Invention

The present invention relates to an improved actuator. More specifically, the invention relates to an improved linear actuator. More concretely, the invention relates to a maintenance technique of the linear actuator, a slider of which moves along a driving shaft which reciprocates or vibrates in a stretching manner.

2. Description of the Related Art

There exists a linear actuator in which a slider is frictionally engaged with a driving shaft which reciprocates or vibrates in a stretching manner so as to be movable along the driving shaft, and the driving shaft is driven asymmetrically in a front-rear direction so that the slider is moved to an arbitrary direction. In such a linear actuator, it is necessary for a stable operation that the slider can move smoothly with a predetermined frictional force on the driving shaft in a non-driving state.

However, when the linear actuator is used for a long time, corrosion which is generated due to a corrosive gas and an oxidizing gas such as hydrogen sulfide, NOx and ozone, deposit such as refuse or an abraded portion are deposited on the driving shaft under some use conditions. As a result, the slider cannot move smoothly with the predetermined frictional force, and thus this may cause a malfunction of the linear actuator.

In addition, in some certain materials of the driving shaft and the slider, a compositional component is separated and adheres to a surface of the material under a steamy environment, and the compositional component contaminates a frictional engagement portion between the slider and the driving shaft. As a result, the frictional force increases, and the slider does not occasionally move smoothly.

The malfunction, which is caused by the deposit deposited on the slider and the driving shaft in the long-time use, can be conventionally solved only by taking out the linear actuator from an apparatus using the linear actuator and removing the deposit using a human hand.

OBJECTS AND SUMMARY

The present invention is devised in order to solve the problem, and it is an object of the present invention to provide an improved actuator. More specifically, its object is to provide an improved linear actuator. More concretely, its object is to provide the linear actuator in which deposit deposited due to long-time use of the linear actuator is removed and malfunction can be prevented.

In order to achieve the above object and another object, a linear actuator according to a certain aspect of the present invention includes: a driving shaft which reciprocates or expands and contracts to its axial direction; a slider which is frictionally engaged with the driving shaft so as to be movable along the driving shaft; and a driving controller for controlling a movement of the driving shaft so that the slider moves to an arbitrary moving direction. The driving controller has a self-maintenance mode for advancing and retreating the slider alternatively, and making an advancing amount and a retreating amount different, and controlling the driving shaft so that the slider is entirely moved to any one of the directions. Concretely, in the self-maintenance mode, the driving controller moves the slider along an entire stroke length. Moreover, the driving controller may reciprocate the slider once along the entire stroke length.

In the above structure, the linear actuator, for example, gives a reciprocating motion which is asymmetry in an axial direction or an expanding/contracting motion to the driving shaft using a device such as a piezoelectric element so as to move the slider frictionally engaged with the driving shaft. The driving controller controls the device such as the piezoelectric element so that the driving shaft reciprocates or expands and contracts, and thus moves the slider to an arbitrary direction.

The driving controller has a normal mode for a case where an apparatus using the linear actuator performs a normal operation and the self-maintenance mode, and controls different motions of the driving shaft in these modes.

In the normal mode, for example, a signal having a saw-toothed waveform and a rectangular waveform is continuously given, so that the slider is moved continuously to one arbitrary direction.

On the other hand, the self maintenance mode is executed as a solving countermeasure when malfunction caused by deposit on the slider or the driving shaft due to a long-time use of the linear actuator occurs or as a previous preventing measure before the malfunction occurs.

In the self-maintenance mode, the driving controller makes the advancing amount and the retreating amount different, and controls the motions of the driving shaft so that the slider advances and retreats alternatively.

In the case where the slider is moved to one direction, if, for example, the slider malfunctions due to the deposit, after the slider is moved to an opposite direction and is again moved to the original direction, when the slider is disengaged from a stop position, a part of the deposit drops or moves, so that a cause of resistance to the slider is reduced. After the slider is retreated and is again driven to the original position in such a manner, when the slider reaches the stop position due to malfunction, the cause of the resistance to the slider is reduced and the slider bumps against the deposit with a moment, so that the slider can be prevented from being stopped.

In addition, for example, when the driving of the slider is continued for a long time, the deposit remains on an end face of the slider, and thus malfunction occurs such that the slider sometimes decelerates and stops. Therefore, before the slider malfunctions, the operation for retreating and driving the slider to the original position is repeated, so that the slider can advance while it is eliminating the deposit on the driving shaft.

In the case where a quantity of the deposit on the driving shaft is large, when a difference between the advancing amount and the retreating amount is made to be small and the slider is advanced in a wiggly manner, the self-maintenance operation can be performed securely. Meanwhile, in the case where a quantity of the deposit is small, even if the different between the advancing amount and the retreating amount is made to be large, the self-maintenance performance can be executed, and time required for the operation can be shortened.

In addition, a linear actuator according to another aspect of the present invention includes: a driving shaft which reciprocates or expands and contracts to its axial direction; a slider which is frictionally engaged with the driving shaft so as to be movable along the driving shaft; and a driving controller for controlling a motion of the driving shaft so that the slider moves to an arbitrary moving direction. The driving controller has a self-maintenance mode for advancing and retreating the slider alternatively with equal amount and abrading a contact portion between the driving shaft and the slider.

In the above structure, in the self-maintenance mode, the driving controller controls the motion of the driving shaft so that the slider advances and retreats alternatively with the equal advancing and retreating amounts.

In the case where deposit adheres to the slider or the driving shaft, the deposit increases a frictional force between the slider and the driving shaft so as to cause malfunction. The self-maintenance mode in such a case repeats the advancing and retreating with equal amounts so as to be capable of performing a frictional operation between the slider and the driving shaft intently for short time.

When the slider is advanced or retreated with equal amounts repeatedly so as to be reciprocated, the slider and the driving shaft rub each other, so that the deposit is disengaged from the surface. The disengaged deposit is eliminated from the contact portion between the slide and the driving shaft at a process for operating the actuator normally, so that the frictional force can be finally returned to its original state.

After the slider is moved in a partial area of the driving shaft in the above manner, the slider is moved from that area and the same operation is repeated. When the advancing and retreating are repeated alternatively also at the time of moving the slider from the area, the slider advances to another area as a high friction area with moment. For this reason, the slider can be moved against the increasing frictional force. This operation is repeated on the entire driving shaft, so that the entire operation of the actuator can be normal. When the operation is repeated, the driving controller moves the slider along the entire stroke length of the driving shaft. Similarly, the driving controller may reciprocate the slider once along the entire stroke length of the driving shaft.

In the case where a quantity of the deposit is large, the advancing amount and the retreating amount are made to be small, so that the operation of the slider can be secured, and a number of times of the reciprocation of the slider is increased so that a abrading effect can be heightened. In the case where a quantity of the deposit is mall, even if the advancing amount and the retreating amount are made to be large, the operation of the slider can be secured. Further, a number of times of reciprocation of the slider is decreased, the necessary abrading effect can be obtained. Therefore, the time required for the self-maintenance operation can be shortened.

The linear actuator of the present invention can be constituted concretely in following various forms.

In the above structures, preferably the driving controller operates at least one of an operation for heightening a driving voltage, an operation for changing a driving frequency and an operation for changing a driving waveform in the self-maintenance mode in comparison with the normal mode.

In the above structure, when a length of the driving shaft is longer, a condition under which a maximum driving force of the slider is used on an end, a center and multi-end portions of the driving shaft differs. In the normal operation, the driving is preferably carried out so that the driving force at the respective portions of the driving shaft is as uniform as possible. Meanwhile, in the self-maintenance mode, the self-maintenance operation is preferably performed while the condition is being changed within a fluctuating range of the slider so that the maximum driving force is used at the respective portions of the driving shaft.

Parameters for fluctuating the driving force of the slider include the driving frequency and the driving waveform. Moreover, since even if a temperature changes, the frequency and the driving waveform with which the maximum driving force of the slider similarly change, while the frequency and the driving waveform are being fluctuated within the fluctuating range of the frequency and the driving waveform with which the maximum driving force is used within an assumed temperature range, the self-maintenance operation can be performed.

In addition, since as a driving voltage is higher, the driving force becomes stronger, the driving voltage is set to be higher at the time of the self-maintenance than the normal operation, so that an effect of the self-maintenance can be heightened.

With the above structure, even if the slider is in any position of the driving shaft at the time of the self-maintenance, the self-maintenance can be executed by the maximum driving force of the actuator, so that the effect of the self-maintenance can be heightened.

In the above structure, preferably an end face of the slider on a side crossing the driving shaft tilts with respect to a direction straight to the slider.

In the above structure, the tilting includes, for example, a case where the end face is formed into a concave or convex shape or is formed slantingly. When the end face of the slider of the linear actuator is formed to tilt with respect to the face straight to the driving shaft, in the case where deposit exists on the driving shaft, the deposit accumulated on the end face of the slider moves along the end face slanted to collect the deposit according to the movement of the slider and simultaneously eliminated. As a result, the deposit on the driving shaft of the actuator is easily eliminated, and occurrence of the malfunction due to the deposit is made to be difficult.

Preferably the linear actuator has a concave portion where the deposit enters at least one of the slider and the driving shaft.

Corrosion and the deposit such as contaminated substance enter the contact portion between the driving shaft and the slider, so that the frictional force therebetween occasionally becomes unstable. The deposit occasionally goes out of the contact portion therebetween due to an effect of a contact pressure or the like, but the deposit remains on the contact portion and thus occasionally keeps the frictional force therebetween unstable. In the above structure, at least one of the driving shaft and the slider is provided with a concave portion for preventing the deposit from entering and influencing the frictional force. The deposit which enters the contact portion makes a certain relative motion with respect to the driving shaft and the slider and simultaneously remains on the contact portion, but when the deposit reaches above the concave portion according to the movement of the slider, the deposit enters the concave portion due to the contact pressure of the slider or the like so as not to influence the frictional force.

Examples of the concave portion provided on the driving shaft are a groove provided spirally on an outer peripheral face of the driving shaft, circular grooves provided with predetermined intervals, a cavity provided randomly or with a predetermined pattern and a groove which extends to the axial direction. Meanwhile, examples of the concave portion provided on the slider are a groove which is provided on a sliding face with the driving shaft and extends to a parallel or orthogonally or slanting direction with respect to the moving direction of the slider, and a cavity provided randomly or with a predetermined pattern.

Therefore, according to the above structure, the deposit on the driving shaft of the actuator hardly influences it, so that the malfunction can be solved or prevented effectively.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawing.

DETAILED DESCRIPTION OF THE PREFERRED EMBODIMENTS

Hereinafter, a linear actuator according to embodiments of the present invention will be explained below with reference to the drawings.

Figure 1A:
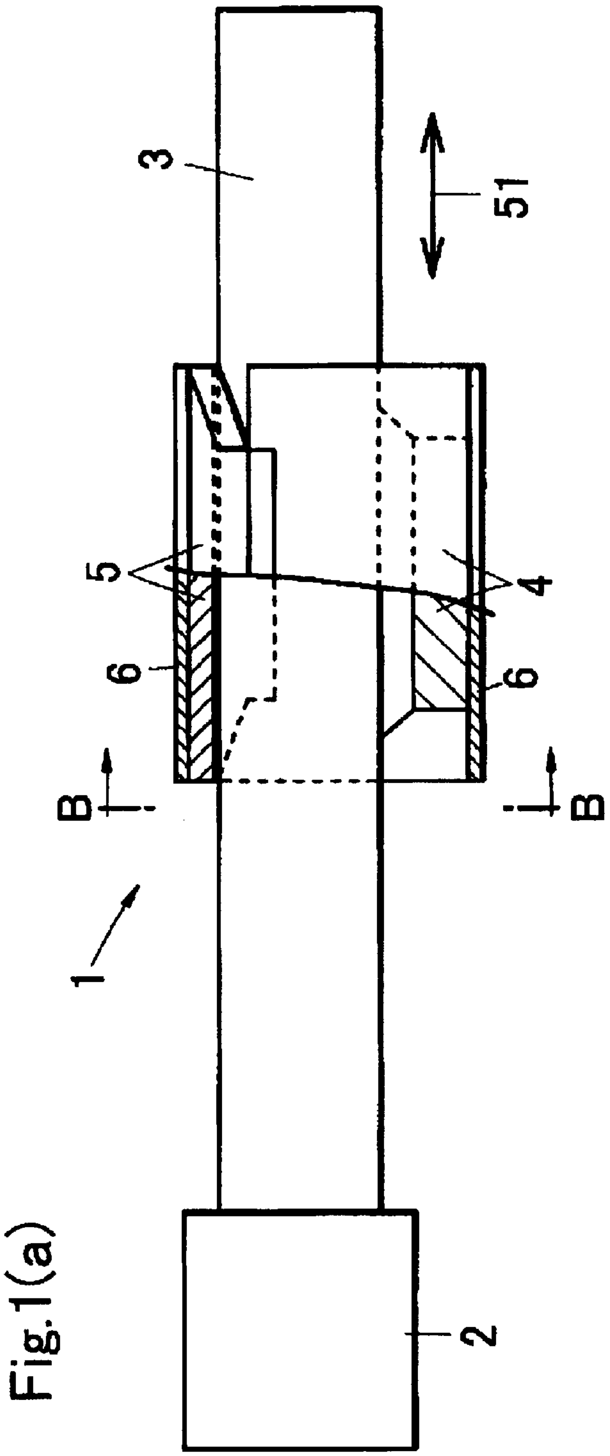
FIGS. 1(*a*) and 1(*b*) are diagrams showing a structure of a linear actuator according to a first embodiment of the present invention, FIG. 1(*a*) is a partially cutaway side view, and FIG. 1(*b*) is a sectional view taken along line B—B of FIG. 9(*a*)
Figure 1B:
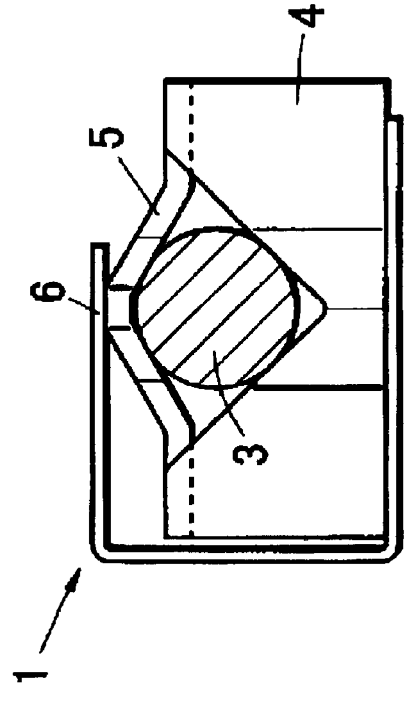

FIGS. 1(*a*) and 1(*b*) are schematic diagrams showing a structure of the linear actuator according to a first embodiment of the present invention. The linear actuator 1 is constituted so that a slider 4 is frictionally engaged with a driving shaft 3 fixed to one end of a piezoelectric element 2 in a stretching direction. The driving shaft 3 is composed of a shaft body of a round bar which extends linearly. The slider 4 is composed of a slider main body 10 and a cap 5, and both of them sandwich the driving shaft 3 from an up-down direction so as to be engaged with the driving shaft 3. In order to enable the slider 4 to move along the driving shaft 3, the slider main body 10 and the cap 5 are pushed each other by an U-shaped plate spring 6 so that a predetermined frictional force is generated between the driving shaft 3 and the slider.

A predetermined driving voltage is applied to the piezoelectric element 2 by a voltage applying device, not shown, so that the piezoelectric element 2 expands and contracts linearly. A width and a speed of the expansion and contraction are primarily proportional to a voltage to be applied.

Figure 2A:
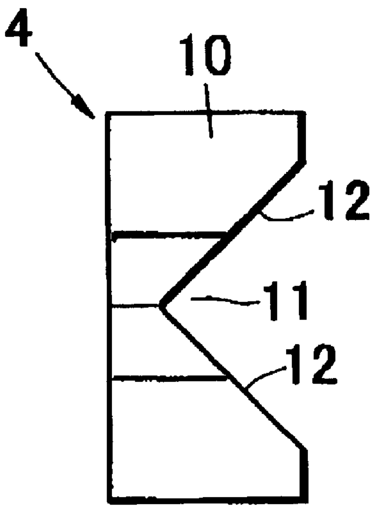
FIGS. 2(*a*) and 2(*b*) are diagrams showing a structure of a slider main body of the linear actuator in FIGS. 1(*a*) and 1(*b*), FIG. 2(*a*) is a side view, and FIG. 2(*b*) is a plan view.
Figure 2B:
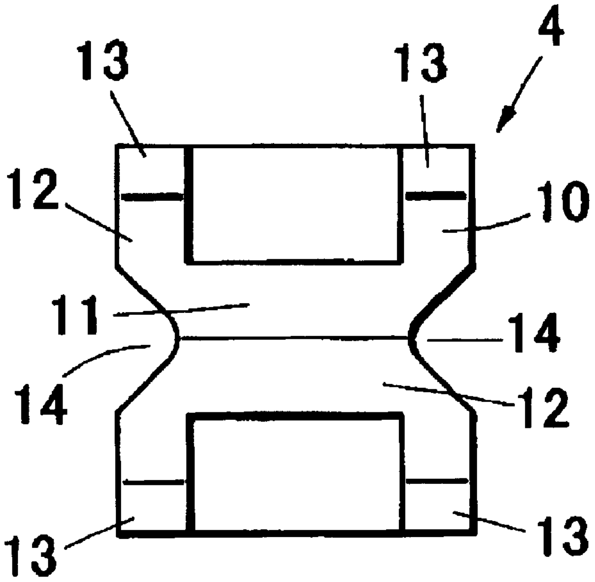

As shown in FIGS. 2(*a*) and 2(*b*), the slider main body 10 is provided with a groove 11 having a V-shaped section on an upper face of the main body 10. The driving shaft 3 is fitted into the groove 11 so as to come in contact with a tilt 12 of the groove 11. In the slider main body 10, a concave portion 14 which is tilted with respect to a direction straight to the driving shaft is provided on a portion which is a part of an end face crossing the driving shaft and is provided with the groove 11 having the V-shaped section. As mentioned later, with the provision of the concave portion 14, when the slider main body 10 moves along the driving shaft, deposit is easily removed.

Four corner portions of the slider main body 10 are provided with a protrusion 13 for fixing the cap, and the protrusions 13 hold the cap 5 which is used in combination with the slider main body 10 so that the cap 5 does not come out of the slider main body 10.

Figure 3A:
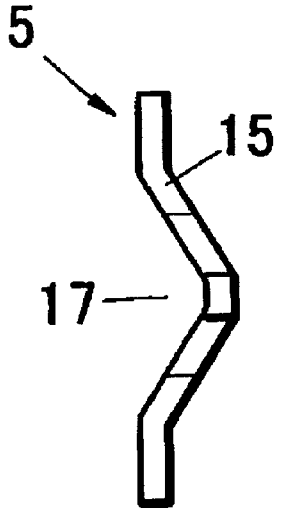
FIGS. 3(*a*) and 3(*b*) are diagrams showing a structure of a cap of the linear actuator in FIGS. 1(*a*) and 1(*b*), FIG. 3(*a*) is a side view, and FIG. 3(*b*) is a plan view.
Figure 3B:
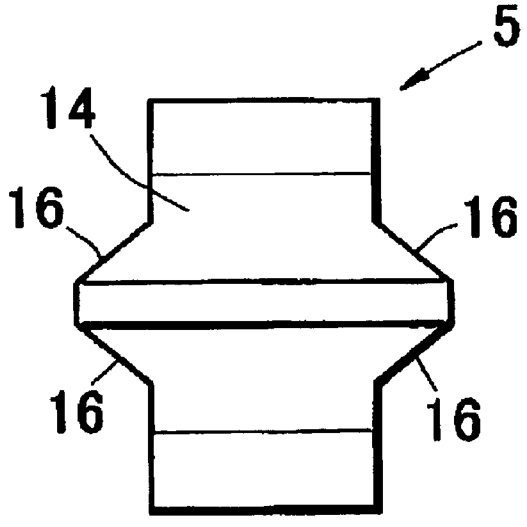

As shown in FIGS. 3(*a*) and 3(*b*), the cap 5 is composed of a plate member in which a cap main body 15 has an approximately V shape. In the case where the cap 5 is combined with the slider main body 10, the driving shaft 3 is fitted into a concave portion 17. The surface 14 which comes in contact with the driving shaft 3 of the cap main body 15 has an end side 16 which is provided slantingly with respect to the direction straight to the driving shaft 3. As mentioned later, with the provision of the tilted end side 16, when the cap main body 15 as well as the slider main body 10 moves along the driving shaft, deposit is easily removed.

An operation of the linear actuator according to the present embodiment will be explained below. When a saw-toothed driving pulse having a calm leading edge and an abrupt trailing edge is applied to the piezoelectric element 2 by the voltage applying device, the piezoelectric element 2 expands to shift to its thickness direction calmly at the calm leading edge of the driving pulse, and the driving shaft 3 fixed to the piezoelectric element calmly shifts to an axial direction. At this time, the slider 4 which is frictionally coupled with the driving shaft 3 moves together with the driving shaft 3 due to the frictional force.

On the other hand, the piezoelectric element 2 suddenly contracts to shift to its thickness direction at the abrupt trailing edge of the driving pulse, and the driving shaft 3 which is couple with the piezoelectric element 2 also shifts quickly to the axial direction. At this time, the slider 4 which is frictionally coupled with the driving shaft 3 overcomes the frictional coupling force due to an inertial force and practically stays in that position so as not to move. The saw-toothed driving pulse is continuously applied to the piezoelectric element 2, so that the slider 4 can be moved continuously to the axial direction. Here, the case where the slider 4 practically stays in that position so as not to move includes a case where although the slider 4 moves while sliding between the slider 4 and the driving shaft 3 is being generated at the time of both expansion and contraction to a positive direction and a negative direction of the driving shaft 3, since a moving amount is not an object, the slider 4 moves to any one arbitrary positional direction.

In order to move the slider 4 to an opposite direction, the saw-toothed waveform to be applied to the piezoelectric element 2 is changed and a driving pulse composed of an abrupt leading edge and a calm trailing edge is applied to the piezoelectric element 2, so that the movement can be achieved by an opposite function to the above one. The driving pulse can adopt also a rectangular waveform or another waveforms.

When the voltage applying device applies the above driving voltage to the piezoelectric element in both a normal mode and a self-maintenance mode, advancing and retreating of the slider are arbitrarily combined and movements peculiar to the respective modes are given to the slider. Switching between the normal mode and the self-maintenance mode may be executed after the operation of the linear actuator 2 becomes unstable or impossible, or with predetermined frequency or timing at the normal operation.

The movements of the slider peculiar to the respective modes are realized in such a manner that the voltage applying device applies different driving voltages to the piezoelectric element 2 in the respective modes. In the normal mode, the driving voltage for continuously moving the slider 4 to any one arbitrary direction is applied. Meanwhile, in the self-maintenance mode, the driving voltage is applied so that the slider 4 is driven to repeat advancing and retreating.

An advancing amount and a retreating amount of the slider 4 in the self-maintenance mode may be set to have a difference, or set to be equal with each other.

When the slider is advanced and retreated alternatively in such a manner, a part of the deposit can be dropped, and when the slider bumps against the deposit with momentum, the slider is prevented from stopping. Moreover, since the slider rubs against the driving shaft, the deposit can be disengaged from the surface.

At this time, the end face of the slider 4 on a side crossing the driving shaft is tilted with respect to the direction straight to the slider, and thus the deposit can be disengaged effectively by the tilt concave portion 14 provided on the slider main body 10 and the end side 16 slantingly provided on the cap main body 15.

Namely, since the concave portion 14 slantingly provided on the slider main body is provided so as to tilt with respect to the advancing direction of the slider 4 on a contact portion between the tilt 12 of the slider main body 10 and the driving shaft 3, a force exerts so that the deposit, which rubs against the contact portion and is about to be disengaged, is collected to a deep portion of the concave portion 14 according to the movement of the slider 4. Similarly, a force exerts on the end side 16 slantingly provided on the cap, so that the deposit which rubs against the contact portion between the cap main body 15 and the driving shaft 3 and is about to be disengaged is scraped according to the movement of the slider 4 so as to be pushed out to both ends. In such a manner, the side in the advancing direction of the slider 4, namely, straight to the driving shaft 3 is provided slantingly, so that the deposit which rubs against their contact portion and is about to be disengaged can be disengaged effectively.

The voltage applying device controls the movement of the slider in the self-maintenance mode different from the normal mode, and may change a driving frequency, a driving waveform and a driving voltage. Namely, since a driving condition which makes the driving force of the slider 4 maximum differs according to a position of the driving shaft 3 and a temperature, in the self-maintenance mode, when the piezoelectric element is driven under the driving condition for making it maximum, even if a lot of deposit adheres, the self-maintenance operation can be performed effectively.

Figures 4A, 4B:
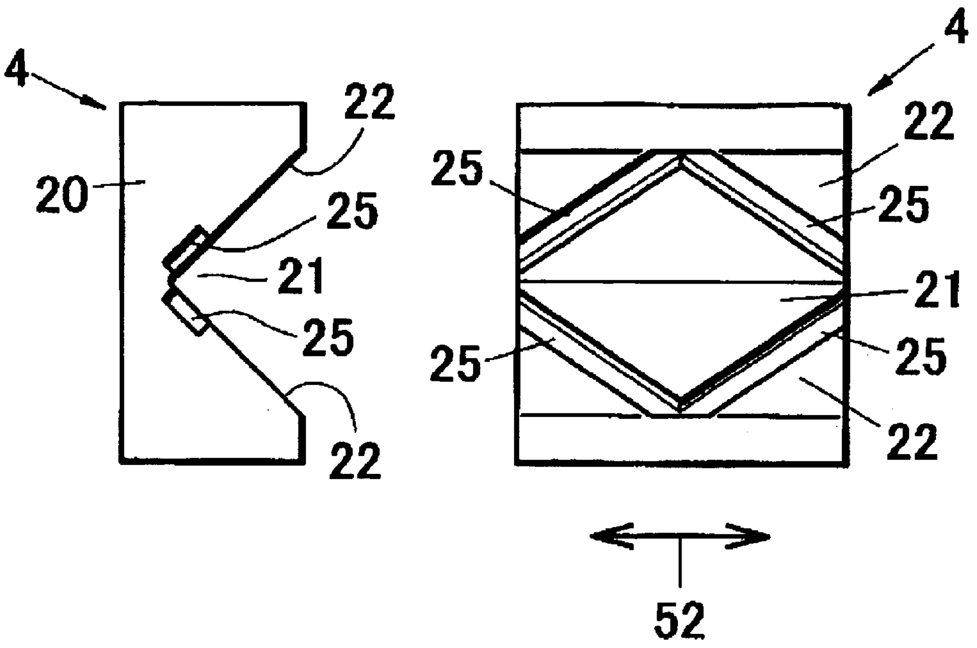
FIGS. 4(*a*) and 4(*b*) are diagrams showing a structure of the slider main body to be used for the linear actuator according to a second embodiment of the present invention, FIG. 4(*a*) is a side view, and FIG. 4(*b*) is a plan view.

A second embodiment of the present invention will be explained below. FIGS. 4(*a*) and 4(*b*) are diagrams showing a structure of the slider main body to be used for the linear actuator according to the second embodiment of the present invention.

A basic structure of the linear actuator of this embodiment is common with that of the linear actuator of the first embodiment. A different point is a structure of a slider main body 20 composing the slider 4. The slider main body 20 is provided with a groove 21 having a V-shaped section on its upper face. The driving shaft 3 is fitted into the groove 21 so as to come in contact with a tilt 22 of the groove 21. The slider main body 20 is provided with a concave groove 25 on the tilt 22 so as to tilt with respect to a moving direction 52 of the slider.

When the contact face between the slider and the driving shaft 3 is provided with the concave groove 25, deposit which adheres to the driving shaft 3 is scraped off by an edge of the groove 25, and as the slider 4 advances, the removed deposit passes through the groove 25 to be discharged to sideway of the slider 4, and the deposit moves to be easily removed.

Figure 5:
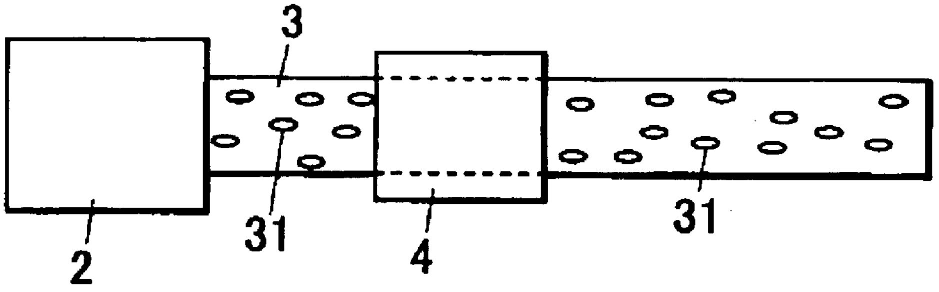
FIG. 5 is a diagram showing the structure of the linear actuator according to a third embodiment of the present invention.

A third embodiment of the present invention will be explained below. FIG. 5 is a diagram showing a structure of the linear actuator according to the third embodiment of the present invention. A basic structure of the linear actuator is common with that of the linear actuator according to the first embodiment. A different point is that a plurality of cavities 31 are provided on an outer surface of the driving shaft 3.

When a plurality of the cavities 31 are provided on the outer surface of the driving shaft 3, in the case where the slider 4 moves along the driving shaft 3, the deposit which enter their contact portion remains on the contact portion while it is making relative motion with respect to the driving shaft 3 and the slider 4 to a certain extent. However, when the deposit reaches above the cavities 31 according to the movement of the slider 4, the deposit enters the cavities 31 due to a contact pressure of the slider 4 or the like so as not to influence the frictional force between the driving shaft 3 and the slider 4.

Figure 6:
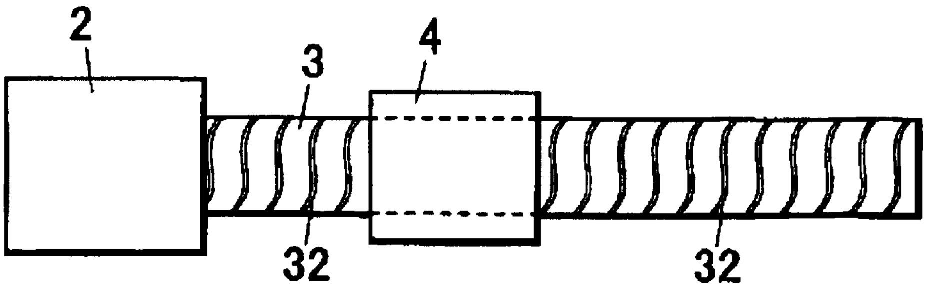
FIG. 6 is a diagram showing the structure of the linear actuator according to a fourth embodiment of the present invention.

A fourth embodiment of the present invention will be explained below. FIG. 6 is a diagram showing a structure of the linear actuator according to the fourth embodiment of the present invention. A basic structure of the linear actuator is common with that of the linear actuator according to the first embodiment. A different point is that a groove 32 which extends spirally is provided on the outer surface of the driving shaft 3.

When the spiral groove 32 is provided on the outer surface of the driving shaft 3, similarly to the linear actuator according to the third embodiment, the deposit enters the spiral groove 32 so as not to influence the frictional force between the driving shaft 3 and the slider 4. Moreover, the groove is provided spirally, so that an area ratio of a portion of the groove 32 to a portion other than the groove can be approximately uniform over the entire driving shaft.

In the above embodiments, the voltage applying device drives the slider in a following manner, so that the self-maintenance operation is performed. In the self-maintenance operation, the driving frequency of the driving voltage, the driving waveform and the driving voltage to be applied to the piezoelectric element 2 are made to be different from those in the normal mode, so that even when the slider is in any position of the driving shaft, the self-maintenance can be carried out by a maximum driving force of the actuator and the effect of the self-maintenance can be heightened.

Figure 7:
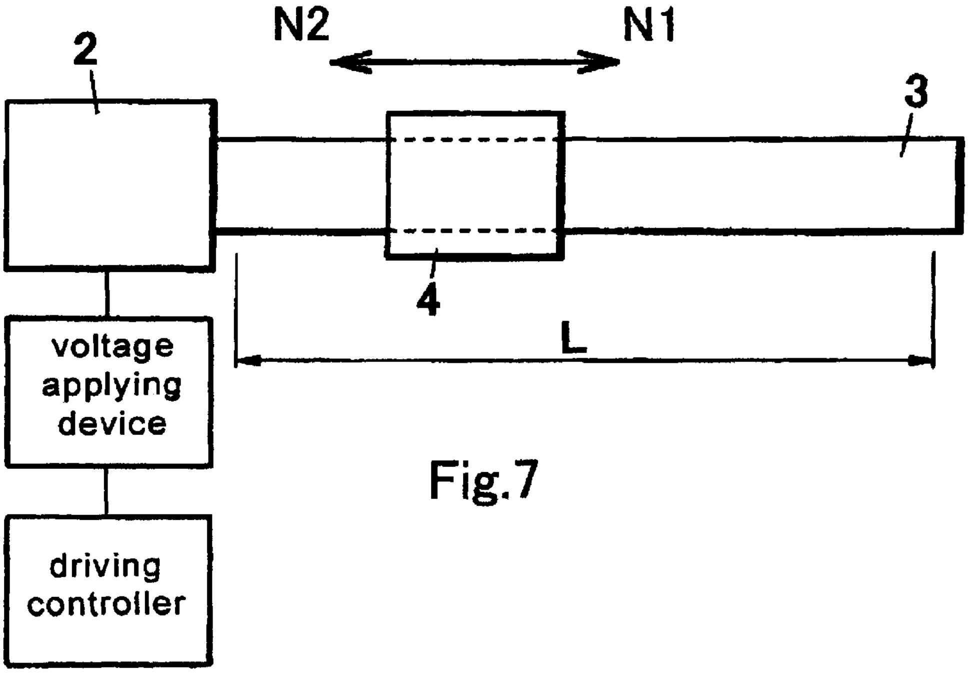
FIG. 7 is a diagram for explaining movement of the slider in a self-maintenance mode.

FIG. 7 is a diagram for explaining the movement of the slider in the self-maintenance mode. As shown in FIG. 6, the slider moves along the driving shaft. As to the moving direction at this time, a movement to a forward end side of the driving shaft 3 is a movement to an N1 direction, and a movement to a root side of the driving shaft 3, namely, a side fixed to the piezoelectric element 2 is a movement to an N2 direction. A following explanation describes the case where the slider 4 is driven along an entire stroke length L of the driving shaft 3, but control may be made so that the self-maintenance is carried out on a part of the driving shaft.

Figure 8:
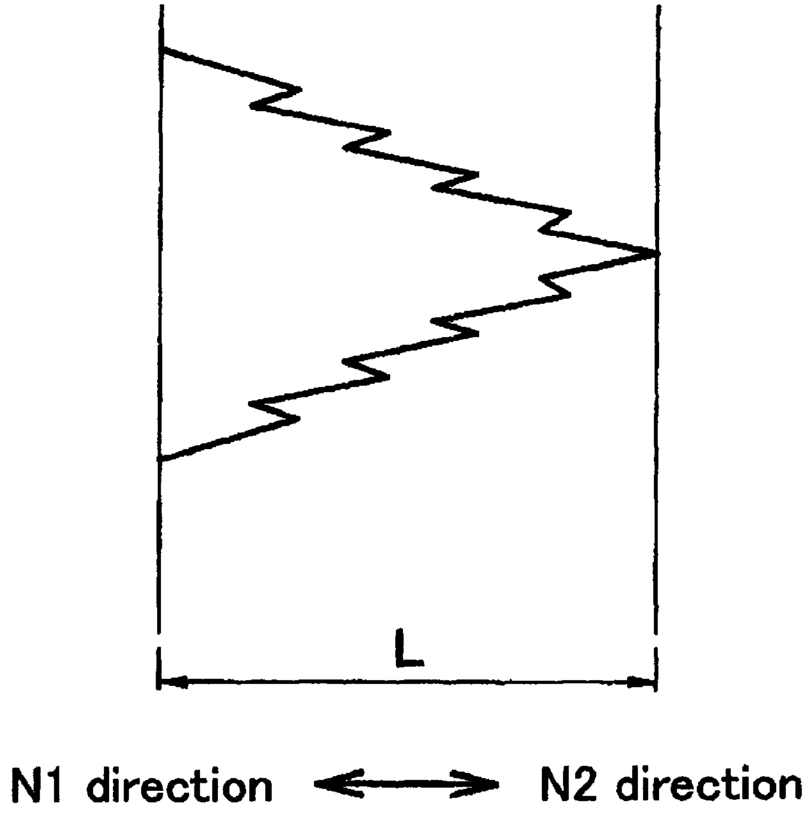
FIG. 8 is an explanatory diagram of a first control example of driving control of the slider in the self-maintenance mode.

FIG. 8 is an explanatory diagram of a first control example of driving control of the slider in the self-maintenance mode. In this control example, the slider 4 starts the self-maintenance starting from the root side of the driving shaft 3.

Firstly moving amounts in both the directions is determined so that the moving amount to the N2 direction is large than the moving amount to the N1 direction. The slider is advanced to the N2 direction along a partial portion of the stroke length L, and is retreated to the N1 direction. As mentioned above, since the moving amount to the N2 direction is larger, as a result the slider 4 advances to the N2 direction only by N2–N1. This process is executed along the entire stroke length L, and when the slider reaches the forward end portion, the moving amounts in both the directions are changed.

The changed moving amounts are set so that the moving amount to the N1 direction is larger than the moving amount to the N2 direction. The slider is retreated to the N1 direction along a partial portion of the stroke length L, and is advanced to the N2 direction. As a result, the slider 4 is retreated to the N1 direction by N1–N2. This process is executed along the entire stroke length L, and when the slider reaches the root portion, the one-time self-maintenance mode is ended. Here, control may be made so that the process of the one-time self-maintenance mode is repeated.

Figure 9:
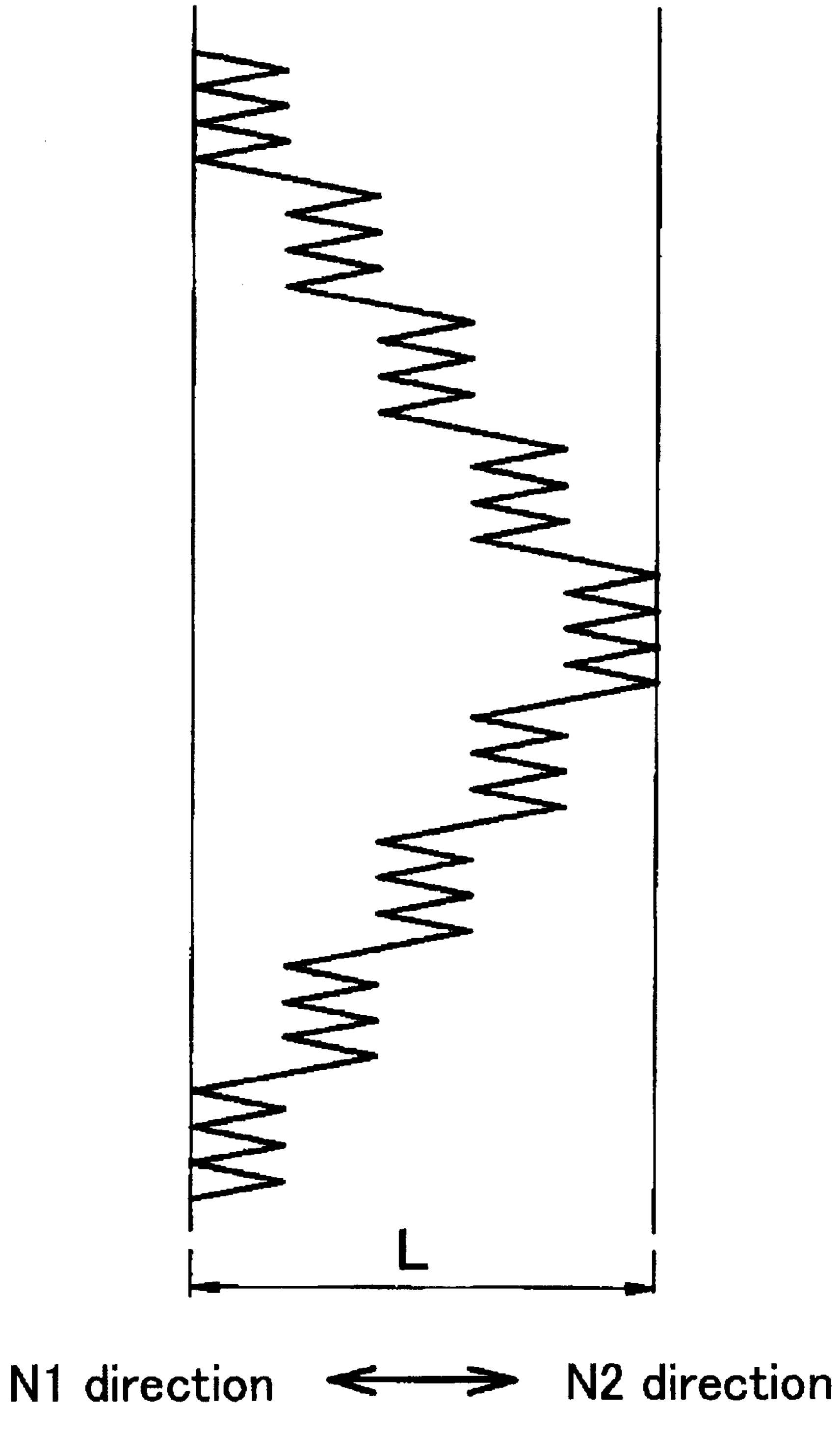
FIG. 9 is an explanatory diagram of a second control example of the driving control of the slider in the self-maintenance mode.

FIG. 9 is an explanatory diagram of a second control example of the driving control of the slider in the self-maintenance mode. Also in this control example, the slider 4 starts the self-maintenance starting from the root side of the driving shaft 3.

Firstly the moving amounts to both the directions are determined so that the movements to the N2 direction and the N1 direction are equal to each other. The slider is advanced to the N2 direction along the partial portion of the stroke length L, and is retreated to the N1 direction. Since the moving amount to the N2 direction is equal to the moving amount to the N1 direction, as a result the slider 4 returns to its original position. This process is repeated at predetermined number of times (three times in FIG. 9), so that deposit can be partially removed.

The moving amounts to both the directions are changed so that the moving amount to the N2 direction is larger than the moving amount to the N1 direction. The slider is advanced to the N2 direction from the original position, and is retreated to the N1 direction. As a result, the slider 4 advances to the N2 direction only by N2–N1. Thereafter, the moving amounts to both the directions are changed so that the moving amounts to the N2 direction and to the N1 direction are equal to each other, and the slider is reciprocated at predetermined number of times (twice in FIG. 9) in a position where the slider advances, so that the deposit is eliminated from that portion. The above partial process is repeated, and after the slider moves along the stroke length L and reaches the forward end portion, the slider is reciprocated at predetermined number of times (three times in FIG. 9).

Thereafter, the moving amounts are changed so that the moving amount to the N1 direction is larger than the moving amount to the N2 direction, and the slider is retreated to the N1 direction along a part of the stroke length L, and is advanced to the N2 direction. As a result, the slider 4 retreats to the N1 direction only by N1–N2. After the moving amounts are changed so that the moving amounts to the N1 and N2 directions are equal to each other, the slider is reciprocated at predetermined number of times (twice in FIG. 9). Similarly this process is repeated, and when the slider reaches the root portion of the driving shaft, the one-time self-maintenance mode is ended. Control may be made so that the process of the one-time self-maintenance mode is repeated.

In the above two control examples, the driving control of the slider in the self-maintenance mode may be arbitrarily selected. For example, in the case where the self-maintenance mode is executed as a solving countermeasure when malfunction occurs, the second control example is sued. In the case where this mode is executed as a previous preventing measure before malfunction occurs, the first control example is used.

As explained above, according to the linear actuator of the embodiments, the malfunction caused by the deposit due to a long-time use can be solved or prevented. Moreover, when the the driving frequency of the driving voltage, the driving waveform and the driving voltage are made to be different from those in the normal mode so as to be applied, even if the slider is in any position of the driving shaft, the self-maintenance can be executed by the maximum driving force of the actuator. Therefore, even in the case where partial reciprocatory driving of the slider is repeated and the self-maintenance operation is performed on the entire driving shaft, the operation can be performed uniformly and effectively on the entire driving shaft.

The present invention is not limited to the above-mentioned embodiments and can be carried out in various modes.

For example, a sweeper composed of a film and a cloth for sweeping the driving shaft with a weak force is provided on the slider, so that a cleaning effect can be provided to the driving shaft. When the sweeper is made of an electret material having permanent electric charge, an absorbing effect of deposit dust removed by the self-maintenance mode can be expected.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A linear actuator comprising:

a driving shaft which reciprocates or expands and contracts to its axial direction;

a slider which is frictionally engaged with the driving shaft so as to be movable along the driving shaft; and a driving controller for controlling a movement of the driving shaft so that the slider moves to an arbitrary moving direction, wherein the driving controller has a self-maintenance mode for eliminating the deposit on the driving shaft by advancing and retreating the slider alternatively, and making an advancing amount and a retreating amount different, and controlling the driving shaft so that the slider is entirely moved to any one of the directions.

2. A linear actuator according to claim 1, wherein the driving controller moves the slider along an entire stroke length in the self-maintenance mode.

3. A linear actuator according to claim 1, wherein the driving controller reciprocate the slider once along the entire stroke length in the self-maintenance mode.

4. A linear actuator according to claim 1, wherein the driving controller operates an operation for heightening a driving voltage in the self-maintenance mode in comparison with a normal mode.

5. A linear actuator according to claim 1, wherein the driving controller operates an operation for changing a driving frequency in the self-maintenance mode in comparison with a normal mode.

6. A linear actuator according to claim 1, wherein the driving controller operates an operation for changing a driving waveform in the self-maintenance mode in comparison with a normal mode.

7. A linear actuator according to claim 1, wherein an end face of the slider on a side crossing the driving shaft tilts with respect to a direction straight to the slider.

8. A linear actuator according to claim 1, wherein the slider has a concave portion where deposit enters.

9. A linear actuator according to claim 1, wherein the driving shaft has a concave portion where deposit enters.

10. A linear actuator comprising:

a driving shaft which reciprocates or expands and contracts to its axial direction;

a slider which is frictionally engaged with the driving shaft so as to be movable along the driving shaft; and a driving controller for controlling a motion of the driving shaft so that the slider moves to an arbitrary moving direction, wherein the driving controller has a self-maintenance mode for eliminating the deposit on the driving shaft by advancing and retreating the slider alternatively with equal amount and abrading a contact portion between the driving shaft and the slider.

11. A linear actuator according to claim 10, wherein the slider move from an area where the slider advancing and retreating alternatively with equal amount and the abrading operation is repeated.

12. A linear actuator according to claim 11, wherein the driving controller moves the slider along an entire stroke length in the self-maintenance mode.

13. A linear actuator according to claim 11, wherein the driving controller reciprocate the slider once along the entire stroke length in the self maintenance mode.

14. A linear actuator according to claim 10, wherein the driving controller operates an operation for heightening a driving voltage in the self-maintenance mode in comparison with a normal mode.

15. A linear actuator according to claim 10, wherein the driving controller operates an operation for changing a driving frequency in the self-maintenance mode in comparison with a normal mode.

16. A linear actuator according to claim 10, wherein the driving controller operates an operation for changing a driving waveform in the self-maintenance mode in comparison with a normal mode.

17. A linear actuator according to claim 10, wherein an end face of the slider on a side crossing the driving shaft tilts with respect to a direction straight to the slider.

18. A linear actuator according to claim 10, wherein the slider has a concave portion where deposit enters.

19. A linear actuator according to claim 10, wherein the driving shaft has a concave portion where deposit enters.

* * * * *